(12) United States Patent
Lemont et al.

(10) Patent No.: US 8,642,005 B2
(45) Date of Patent: Feb. 4, 2014

(54) METHOD FOR PRODUCING HYDROGEN VIA A THERMOCHEMICAL ROUTE, BASED ON HYDROCHLORINATION OF CERIUM

(75) Inventors: Florent Lemont, Villeneuve les Avignon (FR); Alizée Barbier-Maderou, Villeneuve les Avignon (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/577,746

(22) PCT Filed: Feb. 10, 2011

(86) PCT No.: PCT/EP2011/051990
§ 371 (c)(1),
(2), (4) Date: Sep. 6, 2012

(87) PCT Pub. No.: WO2011/098537
PCT Pub. Date: Aug. 18, 2011

(65) Prior Publication Data
US 2012/0321551 A1    Dec. 20, 2012

(30) Foreign Application Priority Data
Feb. 15, 2010 (FR) .................. 10 51059

(51) Int. Cl.
*C01B 3/06* (2006.01)
*C01B 7/01* (2006.01)
*C01B 7/03* (2006.01)

(52) U.S. Cl.
USPC ........... 423/657; 423/263; 423/481; 423/507; 423/579

(58) Field of Classification Search
USPC .................. 423/263, 481, 507, 579, 657
See application file for complete search history.

(56) References Cited

U.S. PATENT DOCUMENTS

2008/0311026 A1* 12/2008 Boen et al. ............... 423/481

FOREIGN PATENT DOCUMENTS

FR    2 880 012 A1    6/2006

OTHER PUBLICATIONS

Onstott, "Cerium dioxide as a recycle reagent for thermochemical hydrogen production by splitting hydrochloric acid into the elements", Hydrogen Energy Prog. X, Proc. World Hydrogen Energy Conf., 10$^{th}$ (1994), vol. 2, 901-9.*
Lemont, Promising optimization of the CeO2/CeCl3 cycle by reductive dissolution of cerium (IV) oxide, International Journal of Hydrogen Energy, vol. 33, No. 24, Dec. 1, 2008, pp. 7355-7360.
Bamberger, "Hydrogen production from water by thermochemical cycles; a 1977 update", Cryogenics, Elsevier, Kidlington, vol. 18, Mar. 1, 1978, pp. 170-183.
Onstott, "Cerium dioxide as a recycle reagent for thermochemical hydrogen production by splitting hydrochloric acid into the elements", International Journal of Hydrogen Energy, Elsevier Science Publishers B.V., Barking, vol. 22, No. 4, Apr. 1, 1997, pp. 405-408.
Onstott, "Thermosplitting of hydrochloric acid for hydrogen production with cerium dioxide as the recycle reagent", Journal of Physical Chemistry, vol. 98, No. 51, Dec. 22, 1994, pp. 13541-13545.
International Search Report issued on Apr. 6, 2011 for International Application No. PCT/EP2011/051990.
Hollabaugh, et al., "A Study of the Cerium-Chlorine System for Thermochemical Production of Hydrogen", University of California, Jan. 1, 2004, pp. 809-828.
Bamberger, "Hydrogen production from water by thermochemical cycles", Cryogenics, Elsevier, Apr. 1976, pp. 197-208.

* cited by examiner

*Primary Examiner* — Wayne Langel
(74) *Attorney, Agent, or Firm* — Knobbe, Martens, Olson & Bear, LLP

(57) ABSTRACT

A method for producing hydrogen via a thermochemical route from water, based on the cerium-chlorine cycle is provided. The method comprises, according to a first reaction scheme, the following reactions:

$H_2O+Cl_2=2HCl+\tfrac{1}{2}O_2$;    (A)

$8HCl+2CeO_2=2CeCl_3+Cl_2+4H_2O$;    (B)

$2CeCl_3+4H_2O=2CeO_2+6HCl+H_2$;    (C)

or, according to a second reaction scheme, the following reactions:

$H_2O+Cl_2=2HCl+\tfrac{1}{2}O_2$;    (A)

$8HCl+2CeO_2=2CeCl_3+Cl_2+4H_2O$;    (B)

$2CeCl_3+2H_2O=2CeOCl+4HCl$;    (B')

$2CeOCl+2H_2O=2CeO_2+2HCl+H_2$;    (C')

wherein the reaction (B) for chlorination of cerium oxide is conducted in a liquid phase, the cerium chloride passing into solution, and wherein the reaction (B) is catalyzed by fluoride ions.

24 Claims, 4 Drawing Sheets

METHOD FOR PRODUCING HYDROGEN VIA A THERMOCHEMICAL ROUTE, BASED ON HYDROCHLORINATION OF CERIUM

RELATED APPLICATIONS

This application is a U.S. National Phase of International Application No. PCT/EP2011/051990, filed Feb. 10, 2011, designating the U.S., and published in French as WO 2011/098537 on Aug. 18, 2011 which claims the benefit of French Patent Application No. 10 51059 filed Feb. 15, 2010.

TECHNICAL FIELD

The invention relates to a method for producing hydrogen via a thermochemical route which is based on the hydrochlorination cycle of cerium.

The technical field of the invention may generally be defined as that of production of hydrogen from water applying thermochemical cycles, in other words the invention lies in the field of hydrogen production based on thermal decomposition of water assisted by "thermodynamic catalysts".

BACKGROUND

Production of hydrogen by utilization of thermochemical cycles has been a widely studied field since the late 60 s and has been subject to systematic evaluation of the elements which may be involved.

Among these thermochemical cycles, hydrogen production cycles based on oxidation-reduction of cerium, and in particular on the cerium-chlorine system have attracted attention.

The thermochemical cycle based on the oxidation-reduction of cerium may be described by the following reactions, according to a first alternative:

$$H_2O + Cl_2 = 2HCl + \tfrac{1}{2}O_2; \tag{A}$$

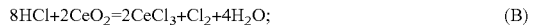
$$8HCl + 2CeO_2 = 2CeCl_3 + Cl_2 + 4H_2O; \tag{B}$$

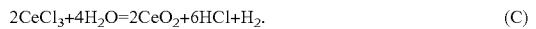
$$2CeCl_3 + 4H_2O = 2CeO_2 + 6HCl + H_2. \tag{C}$$

According to a second alternative, this thermochemical cycle may be described by the following reactions.

$$H_2O + Cl_2 = 2HCl + \tfrac{1}{2}O_2; \tag{A}$$

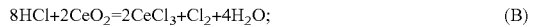
$$8HCl + 2CeO_2 = 2CeCl_3 + Cl_2 + 4H_2O; \tag{B}$$

$$2CeCl_3 + 2H_2O = 2CeOCl + 4HCl; \tag{B'}$$

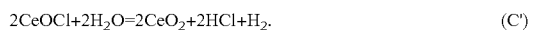
$$2CeOCl + 2H_2O = 2CeO_2 + 2HCl + H_2. \tag{C'}$$

The document of C. E. BAMBERGER <<Hydrogen Production from Water by Thermochemical Cycles>>, Cryogenics, March 1978, p. 170-182, [1] gives a list of 129 thermochemical cycles having been the subject of publications between October 1975 and September 1977. This document supplements a first list of 72 thermochemical cycles published in 1976 in the document of BAMBERGER C. E., RICHARDSON D. M., Cryogenics, 16 (1976), p. 197, [2].

Among these 129 cycles, cycles are mentioned which involve cerium chloride according to the two mentioned alternatives (cycles No. 30 and No. 31, p. 173, of the first document of BAMBERGER).

The document of C. M. HOLLABAUGH, E. I. ONSTOTT, T. C. WALLACE Sr., and M. G. BOWMAN, <<A study of the cerium-chlorine system for thermochemical production of hydrogen>> [3] studies in detail the cycle involving cerium chloride.

The document of C. M. HOLLABAUGH is focused on the second alternative of the cerium chloride cycle and in particular on the three last reactions (B), (B'), (C') of the cycle, mentioned above.

These reactions are all heterogeneous reactions in which a gas (HCl or $H_2O$) comes into contact with a solid ($CeO_2$, $CeCl_3$ or CeOCl), reacts with it and transforms it into a solid product ($CeCl_3$, CeOCl, or $CeO_2$). The first reaction, (A), which is not studied in the HOLLABAUGH document, as for it, only involves gases.

The fact that the reactions involved are in this document, all conducted in a solid-gas phase or in a gas-gas phase leads inter alia to the following difficulties and problems:

- a limitation of the degrees of progression of the reactions by passivation of the surfaces, thus the work carried out by HOLLABAUGH et al. [3] shows that at best a progression coefficient of 0.3 is attained after 50 minutes;
- a limitation of the reaction kinetics by diffusion of gas species inside the solids;
- heating of solid particles which is sometimes difficult to achieve;
- several transports of solids to be carried out for conveying the species from one reactor to the other;
- a significant modification of the molar volumes of the solid $CeO_2$ and $CeCl_3$ with a 260% increase between the two, which has the consequence that the stability of the conversion reactors is difficult to maintain.

The same problems are posed as regards the first alternative of the thermochemical cycle of cerium which involves the same reactions (A) and (B).

The conclusion had been drawn that essential problems are posed during the application of the oxidation-reduction cycle of cerium both in its first and its second alternative, in terms of reactivity and control of the process.

A method for producing hydrogen via a thermochemical route from water, based on oxidation-reduction of cerium and more specifically on the cerium-chlorine cycle, with which it is possible to solve the problems of the methods described in documents [1], [2] and [3] mentioned above, is proposed in document FR-A-2 880 012 [4].

In the method of document [4], the reaction (b) is conducted in a liquid phase, more specifically in a solution of hydrochloric acid, and in which $CeO_2$ is introduced in solid form.

However, it was found that the hydrochlorination reactions (B) of each of the reaction schemes depended on a wide proportion of the cerium oxide batches used and that, if certain batches gave excellent results, other batches on the contrary gave poor results or even bad results in terms of dissolution of $CeO_2$.

In other words, it was observed that for certain batches, dissolution of $CeO_2$, although existent, was immensely slow and that it therefore considerably limited the efficiency and the overall yield of the method.

Regarding the foregoing, there consequently exists a need for a method for producing hydrogen via a thermochemical route from water, based on the chlorine-cerium cycle, in which the hydrochlorination reaction (B) of cerium oxide is conducted, like in document [4], in a liquid phase, which allows global improvement in the kinetics of the reaction (B) or dissolution reaction, and which ensures that this dissolution reaction is effective and reliable.

There still exists a need for such a method, in which the dissolution reaction (B) may actually be applied with high reliability and great reproducibility regardless of the origin of the $CeO_2$ and regardless of the cerium oxide batch used.

In other words, there exists a need for a method for producing hydrogen via a thermochemical route from water, based on the chlorine-cerium cycle, in which the reaction (B) for hydrochlorination of cerium oxide is conducted, like in document [4], in a liquid phase, which has all the advantages of the method subject of document [4], widely described in the latter, but which does not have the drawbacks thereof, essentially related to the randomness of the dissolution kinetics of $CeO_2$ during step (B), and to the very slow dissolution rate of cerium oxide often observed during the reaction (B).

The goal of the present invention is to provide a method for producing hydrogen via a thermochemical route from water, based on the chlorine-cerium cycle, in which the reaction (B) for hydrochlorination of cerium oxide is conducted like in document [4] in a liquid phase, which inter alia meets the needs listed above.

SUMMARY OF THE INVENTION

This goal and further other ones are achieved according to the invention by a method for producing hydrogen via a thermochemical route from water, based on the cerium-chlorine cycle, wherein according to a first reaction scheme, the following reactions are conducted:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 4H_2O = 2CeO_2 + 6HCl + H_2; \quad (C)$$

or wherein, according to a second reaction scheme, the following reactions are conducted:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 2H_2O = 2CeOCl + 4HCl; \quad (B')$$

$$2CeOCl + 2H_2O = 2CeO_2 + 2HCl + H_2; \quad (C')$$

wherein the reaction (B) for hydrochlorination of cerium oxide is conducted in a liquid phase, the cerium chloride passing into solution; and wherein the reaction (B) is catalyzed by fluoride ions.

There is no limitation on the form in which the fluoride ions are added into the solution in which reaction (B) is conducted, in order to catalyze the latter.

In other words, the counter-cation associated with the fluoride ions has no influence on the catalysis process of reaction (B), nor on the method according to the invention considered in its entirety. Catalysis by fluoride ions has been demonstrated regardless of the cation associated with fluorine. Many tests have been conducted with different types of fluorides. The same results have thus been obtained with LiF, NaF, $MgF_2$ and $CaF_2$.

Advantageously, the fluoride ions appear in the form of at least one fluoride selected from metal fluorides, such as fluorides of alkaline and earth alkaline metals.

However, the method according to the invention is not limited to fluorides of alkaline and earth alkaline metals, and in addition to alkaline or earth alkaline fluorides, all metal fluorides may be used.

For reasons of chemical and thermal stabilities, the preferred fluoride is calcium fluoride $CaF_2$, also called fluorite, since this fluoride has a melting point above 1,400° C. But any other fluorinated compound may be used.

This (these) fluoride(s) is (are) added to the hydrochloric solution in which reaction (B) occurs and in which $CeO_2$ is introduced in solid form.

Advantageously, the amount of fluoride ions is of at least 1.5 mg per gram of $CeO_2$, preferably from 1.5 mg to 4 mg, still preferably from 1.5 mg to 2.5 mg, better from 1.7 mg to 2 mg per gram of $CeO_2$.

In the case of $CaF_2$, the amount of $CaF_2$ may generally be from 5 to 10 mg, for example 6 mg per gram of $CeO_2$.

Advantageously, the reaction (A) for reducing chlorine may be conducted with an excess of water relatively to the stoichiometry of the reaction.

Advantageously, in reaction (A), water may be in excess relatively to stoichiometry, by a factor which may range up to 20 and beyond, preferably from 1 to 10.

Reaction (A) is generally conducted in a gas phase at a temperature from 500 to 1,000° C., for example 700° C.

Advantageously, the reaction (A) may be assisted with UV irradiation.

Advantageously, in the first reaction scheme, the reaction B) is conducted with an excess of HCl.

Advantageously, in the first reaction scheme, the reaction (B) is conducted with an excess of hydrochloric acid by a factor from 1 to 4, for example 1.5 relatively to the stoichiometry described in the corresponding chemical equation.

Advantageously, the reaction (B) is conducted in an aqueous solution of hydrochloric acid brought to a temperature from 30 to 110° C., for example 110° C. $CeO_2$ is introduced into said solution in solid form.

The acidic aqueous solution of cerium chloride which is, in the first reaction scheme, produced by the reaction (B), is atomized in the reaction (C) or nebulized, sprayed, by means of pressurized steam, whereby the cerium chloride is hydrolyzed into solid $CeO_2$.

According to the first reaction scheme, the reaction (C) is advantageously conducted at a temperature from 600 to 1000° C., for example 750° C.

The acidic aqueous solution of cerium chloride produced by reaction (B), is, in the second reaction scheme, evaporated, vaporized, in the reaction (B'), for giving solid cerium oxychloride CeOCl.

Advantageously, the reaction (B') is conducted at a temperature from 100 to 300° C., for example 130° C.

Advantageously, the reaction (C') for hydrolysis of cerium oxychloride is conducted by means of steam, optionally pressurized steam, whereby cerium oxychloride is hydrolyzed into solid $CeO_2$.

The reaction (C) of the first reaction scheme or the reaction (C') of the second reaction scheme produces a mixture of gases, i.e. HCl and $H_2$— and solid $CeO_2$, from which hydrogen is advantageously separated by condensation. Prior to said condensation, it is optionally possible to carry out a gas-solid separation operation for separating solid $CeO_2$ from the gases.

Advantageously, the gases are condensed to give a solution of hydrochloric acid sent to reaction (B) as well as the solid $CeO_2$.

Advantageously, the reactions (C) and (C') are conducted with excess water relatively to stoichiometry.

The reaction (A) of the first and second reaction schemes produces a gas mixture of HCl and of oxygen from which oxygen is separated by condensation.

Advantageously, the water formed during reaction (B) is separated by distillation.

Advantageously, the water separated by distillation is conveyed with the formed chlorine gas, and optionally the excess hydrochloric acid, towards a condensation step at the end of which chlorine is recovered on the one hand and water and optionally excess hydrochloric acid are recovered on the other hand.

Advantageously, the water recovered in the aforementioned condensation step is sent into reaction (C) or (C'), and the chlorine as well as the possible excess hydrochloric acid are sent into reaction (A).

Advantageously, the energy recovered during the condensations is used for ensuring the vaporizations and distillation and optionally for feeding a turbine if an available energy remainder still subsists.

The method according to the invention may be defined as a modification or rather an improvement of the method described in document [4] in which the addition of fluoride ions, for example in the form of calcium fluoride $CaF_2$, allows catalysis of the reaction for dissolving cerium oxide $CeO_2$ which may rather be described as a reducing dissolution of $CeO_2$ into $CeCl_3$.

A mechanism for dissolving $CeO_2$ in an acid medium, catalyzed by fluoride ions has been proposed, which complies with the following reaction scheme with the following successive reactions (B'') and (B'''):

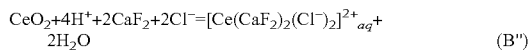  (B'')

The $Ce^{4+}$ ions stabilized by hydrochlorofluoric complexation are then reduced by the chloride ions according to the following reaction (B'''):

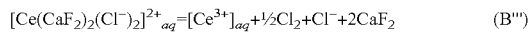  (B''')

The $Ce^{3+}$ ions in solution are then re-oxidized in reaction (C) or (C') according to the first or according to the second reaction scheme of the method according to the invention.

The application of fluoride ions for catalyzing the hydrochlorination reaction (B) of cerium oxide $CeO_2$, conducted in a liquid phase, in the first or in the second reaction scheme described above within the scope of the method of document [4] is neither described, nor suggested in the prior art mentioned in the foregoing and more particularly in document [4].

By catalyzing, in accordance with the method according to the invention, the reaction (B) of the first or of the second reaction scheme by addition of fluoride ions, one surprisingly manages to overcome the drawbacks of the reaction (B) conducted in the method of document [4], and consequently to also overcome the drawbacks exhibited by the method of document [4] as a whole.

The method according to the invention does not have the drawbacks and defects of the method of document [4] and solves the problems posed by the method of document [4].

Thus, in the method according to the invention because of the application of fluoride ions as catalysts, the dissolution reaction (B) may actually be conducted with high reliability and great reproducibility regardless of the origin of the $CeO_2$ and regardless of the cerium oxide batch used.

In other words, the method according to the invention has all the advantages of the method described in document [4] and which are widely described in the latter, but does not have the drawbacks thereof, essentially related to the randomness of the kinetics for dissolving $CeO_2$ during step (B) and to the very slow dissolution rate of the cerium oxide often observed during reaction (B).

In the method according to the invention, the rate of reaction (B) is relatively fast. For example, the use of a 20% HCl solution with a stoichiometry twice the one indicated by the reaction B allows total progression in about ten minutes. Further, the reaction rate is fast regardless of (whatever) the $CeO_2$ used and the method according to the invention is therefore always globally reliable, reproducible, fast and with a high yield.

During the reaction (B) of the method according to the invention, the compound $CeCl_3$ is gradually solubilized as it forms.

Just like the method of document [4], the method according to the invention may, in a simplified way, be described as a <<cer hydrochlorine>> method for producing hydrogen based on the thermochemical cerium-chlorine cycle with passing through an aqueous route. The method according to the invention may, further be defined as a <<catalyzed>> method during the hydrochlorination reaction.

Indeed, the method according to the invention, both in the first and in the second reaction scheme, is fundamentally different from the methods of the prior art [3] applying the same cerium-chlorine system, in the sense that reaction (B) is conducted in a liquid phase and not in a solid-gas phase.

The other reactions involved in the first reaction scheme, i.e. the reaction (A) and the reaction (C) are reactions in a gas phase.

The method according to the invention in the first reaction scheme therefore does not involve any reaction in a solid-gas phase with all the drawbacks which this includes.

In the case of the second reaction scheme, the reaction (B') is a solid-gas reaction, but in which passivation of the solids is limited and the kinetics are acceptable.

The method according to the invention defines a thermochemical cycle for producing hydrogen ensuring maximum progression of the reactions involved in each of the cycles because of the coupling within a same process scheme of a reaction in a liquid phase and of reactions in a gas phase.

The method according to the invention, in particular the method involving the first reaction scheme, just like the method of document [4], does not have the drawbacks, defects, limitations and disadvantages of the methods of the prior art, subject of documents [1] to [3] and notably the method described in the HOLLABAUGH document [3].

Indeed, because the reaction (B) is conducted in a liquid phase, total exhaustion of the solids ($CeO_2$) fed into the system is ensured.

This reaction is, in the present method, catalyzed by fluoride ions, the counter-cation of which has no influence.

Accordingly, transport of the cerium chloride formed during reaction (B) towards the subsequent steps, i.e. the hydrolysis reaction (C) of the cerium chloride in the case of the first reaction scheme or the hydrolysis reaction (B') in the case of the second reaction scheme is also conducted in a liquid phase, and this may be carried out very simply.

Carrying out the reaction (B) in a liquid phase, according to the invention, causes solubilization of the products of the reaction in the reaction (B) which precludes passivation and forces the progression coefficient as far as 1.

Diffusion of the gases into solids does not exist in reactions (A) and (B) and is therefore not a limiting factor.

In the case of reaction (C), hydrolysis is directly accomplished via nebulization of an acidic cerium chloride solution assisted by pressurized steam. This nebulization induces the formation of micron-sized drops, for example in an oven brought to the reaction temperature. Local vapor pressures make it possible to retain a gaseous reaction environment and gas/solid diffusion is thus greatly limited.

Partial distillation of the water during reaction (C) or (B') may allow production of the required water for ensuring nebulization and hydrolysis of the reaction.

Separation of hydrogen and of oxygen may be accomplished by condensing the $H_2O$—HCl mixture, thereby reducing the requirement of setting up membrane systems.

The solids produced in the method are cyclically dissolved, there is no surface passivation.

Transport of solids is limited to the transition from the reaction C towards reaction B with recycling of the $CeO_2$.

Cerium chloride $CeCl_3$ is always in solution, consequently, problems of change in molar volume no longer exist.

In the case of the second reaction scheme, the evaporation step (B') transforming $CeCl_3$ into CeOCl adds a solid transport and a solid-gas reaction which it would have been possible to believe that it might be limited by diffusion of the gases into the solids.

The striction resulting from the transformation of CeOCl into $CeO_2$ limits passivation of the solid reagents and allows acceptable kinetics.

The invention will be better understood upon reading the detailed description which follows, made with reference to the appended drawings wherein:

The $CeCl_3$ concentration expressed in g/L is plotted on ordinates and time (in minutes) is plotted on abcissae.

It should be noted that the concentration of 0.04 g/L corresponds to a 100% progression percentage and that the concentration of 0.02 g/L corresponds to a 50% progression percentage.

The curves illustrate the results of the tests conducted with amounts of $CaF_2$ corresponding to a base amount of 0.25 mg of $CaF_2$ multiplied each time by a different multiplier factor, i.e. 3, 6, 8 (curves A), 13 (curve B), 50 (curve C), 100 (curve D), 200 (curve E) and 400 (curve F).

DESCRIPTION OF CERTAIN ILLUSTRATIVE EMBODIMENTS

Figure 1:
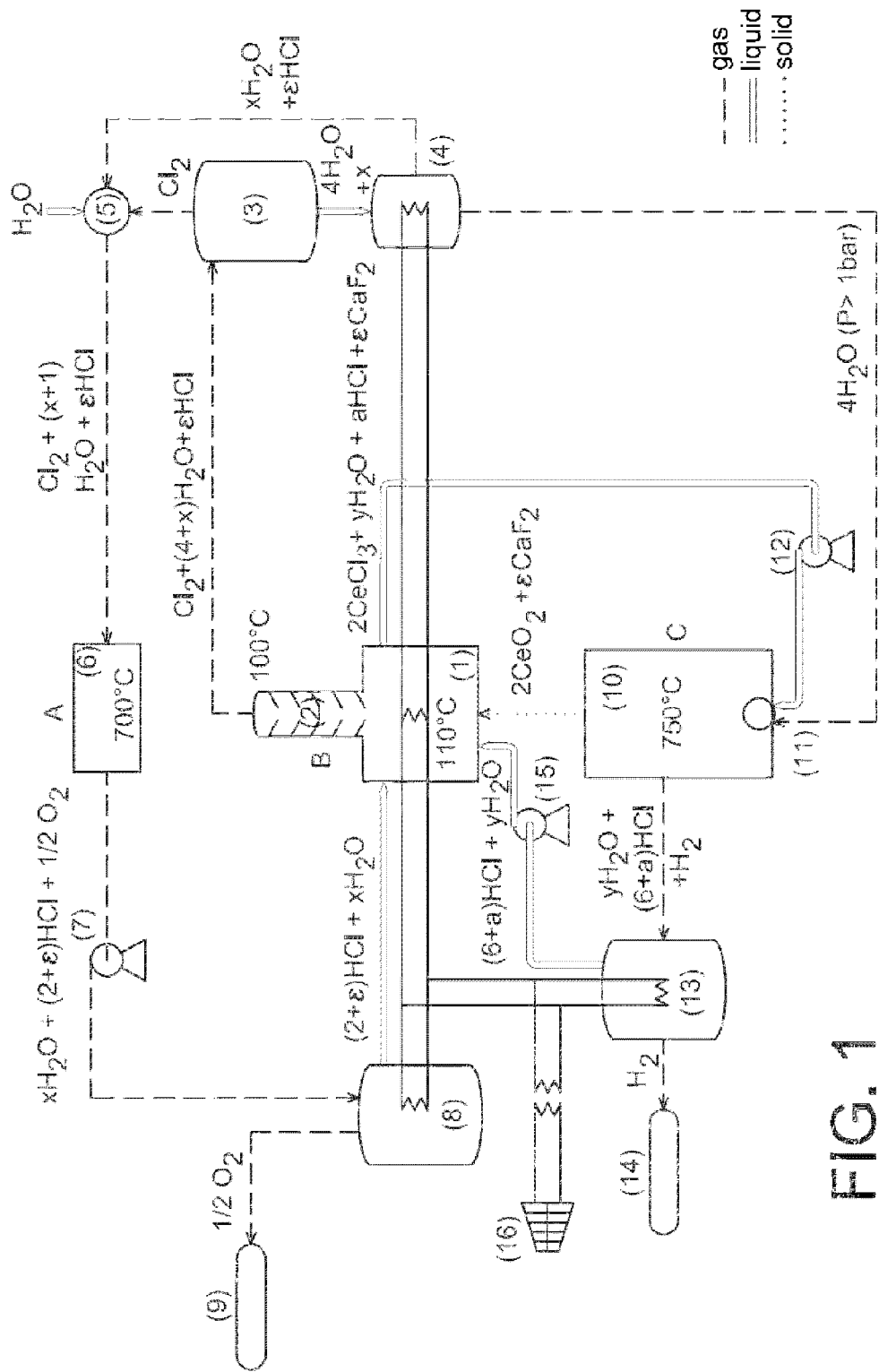
FIG. 1 is diagram of the method according to the invention applying the first reaction scheme.

In FIG. 1, the diagram of the method according to the invention is represented, applying a cycle corresponding to the first reaction scheme mentioned above.

The method comprises steps involving the reactions (A), (B), (C), mentioned earlier.

Reaction (B) is applied in a reactor where hydrochlorination of cerium oxide is ensured in a liquid phase in the presence of a fluorinated catalyst, more specifically of fluoride ions.

This hydrochlorination reaction, which consumes hydrochloric acid and produces water, is carried out in the low portion (1) of said reactor at a temperature from 30 to 110° C., for example 110° C.

The water is continuously distilled by means of a reflux column (2) generally operating at a temperature of 100° C. and which generally forms the upper portion of the reactor.

At the top of the distillation column, a stream comprising water, chlorine, and trace amounts of HCl, i.e. a stream having the composition $Cl_2+(4+x) H_2O+\epsilon$ HCl (wherein x represents over stoichiometry of $H_2O$ of reaction A), is conveyed to a condenser (3).

Figure 2:
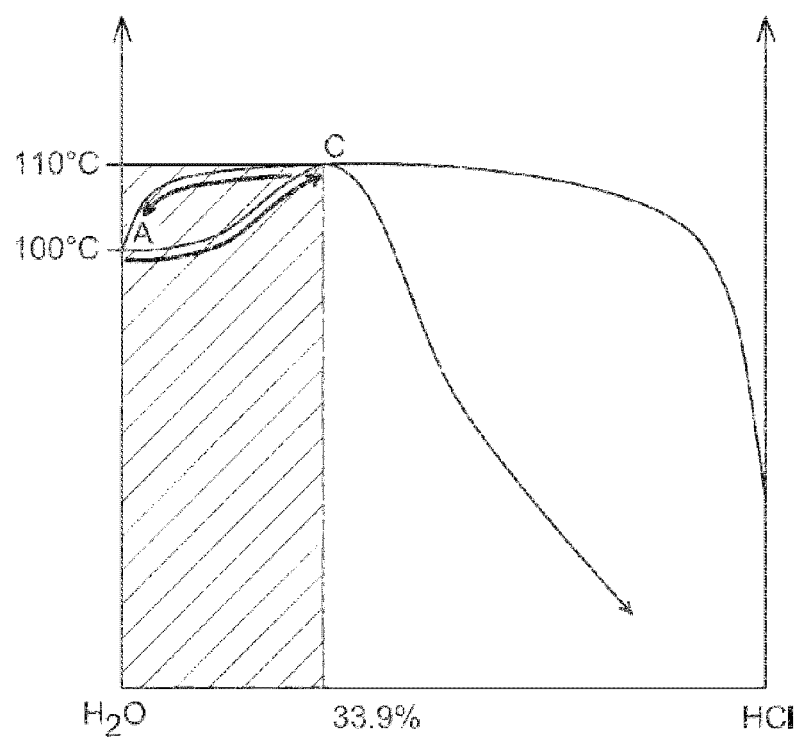
FIG. 2 is a graph representing the $H_2O$—HCl phase diagram. The temperature (in ° C.) is plotted on the ordinates and the water and respectively HCl mass percentage is plotted on the abcissae.

The reaction (A) requires having water as pure as possible, which imposes operation on the water-rich side of the $H_2O$—HCl azeotrope, as this is indicated in FIG. 2, where the area of the $H_2O$—HCl phase diagram in which the method of the invention is preferably utilized, is illustrated by hatching. Distillation ensures on the one hand that a gas is obtained at the top of the column, having a composition allowing it to be conveyed to reaction A (point A on the vaporization curve of FIG. 2) and on the other hand, HCl-enrichment of the liquid towards an azeotropic solution which may be directed towards reaction C on the other hand (point C on the dew curve of FIG. 2).

The method is governed by the HCl stoichiometry used during reaction B.

According to the invention, reaction (B) in the first reaction scheme, is generally conducted with an excess of HCl relatively to stoichiometry. Preferably in the first reaction scheme, the reaction (B) is conducted with an excess of hydrochloric acid by a factor of 1 to 4, for example 1.5, relatively to stoichiometry.

Experience has shown that by using a 20% HCl solution with a stoichiometry of twice the one indicated by reaction B, it is possible to obtain total progression within about ten minutes.

By using an azeotropic solution (with 33.9% by mass of HCl: see FIG. 2), or optionally a sub-azeotropic solution, it is possible to have the $H_2O$ over-stoichiometry (illustrated on the diagram of the method or the flow chart of FIG. 1) required for maximum progression of the reaction C.

In order to ensure maximum progression of the reaction A, in order to avoid any setting up of a $O_2/Cl_2$ separation system, it is necessary to operate with a high over-stoichiometry (x on the flow chart) of $H_2O$, the latter may attain a factor 20, or even beyond and is preferably located in a range from 1 to 10.

Indeed the excess of water in the method is related to the solubilization of cerium chloride in an aqueous solution and is not set by the reaction (A). The fact of having over-stoichiometry is therefore related to reaction B. The solubility limit of $CeCl_3$ is about 1 kg/L, this corresponds to about 4 moles of $CeCl_3$ for 55 moles of water. One thus has generally a minimum water ratio imposed by reaction (B). This minimum ratio is 1 mol of $CeCl_3$ for 13.75 mol of $H_2O$. Thus, the minimum over-stoichiometry of water is 7 relatively to the reaction (C). However, over-stoichiometry is larger because a sub-azeotropic mixture has to be used in reaction (B). As the azeotrope is set to 33.9% by mass of HCl in water, an over-stoichiometry of 1.5 for example is imposed for HCl in reaction (B), this imposes raising of the over-stoichiometry of water, for example to about 12 relatively to the reaction (C). Thus, depletion of HCl in the reaction (B) leaves the possibility of distilling an amount of water which, if it is totally sent to reaction (A), will represent an over-stoichiometry considerably larger than 20.

In other words, the water over-stoichiometry is imposed by the solubility of the $CeCl_3$ (1 kg/L) and by the selected HCl stoichiometry in reaction (B) which imposes via the azeotrope a minimum amount of water.

The reactivity may be improved by using UV radiation allowing homolytic dissociation.

Under the assumption that it would be possible to have membranes which may separate $O_2$ and $Cl_2$, this over-stoichiometry may be lowered by a factor 10.

The excess water from reaction (A) is cycled between the reactors (60) and (1) for reaction (A) and reaction (B) respectively. In the reactor (1), it is subjected to a distillation (2) together with water from reaction (B).

The stream from the distillation column (2) and containing water ((4+x) $H_2O$), chlorine ($Cl_2$) and trace amounts of hydrochloric acid ($\epsilon$ HCl) is conveyed towards a condenser (3) operating at a temperature generally from 70 to 100° C., which allows separation of $Cl_2$ (gas) from $H_2O$ (liquid).

The separated liquid water is transferred into an evaporator (4) in which the water is heated to a temperature of generally 150° C. thereby generating steam with a pressure generally close to 4.5 bars.

A portion of this water as a gas stream of composition x $H_2O+\epsilon$ HCl is conveyed from the evaporator (4) to an expander/mixer (5) which also receives a liquid stream of additional water required for producing hydrogen and a gas stream of chlorine from the condenser (3).

A gas stream of composition $Cl_2+(x+1)$ $H_2O+\epsilon$ HCl leaves the expander/mixer (5) and is introduced into a reactor (6) in which the HCl production reaction (A) is conducted. This reaction is a reaction in a gas phase generally conducted at a temperature from 500 to 1,000° C., for example 700° C.

A gas stream of composition $xH_2O+(2+\epsilon)$ HCl+½ $O_2$ which is sent into a condenser (8), flows out of the reactor (6) for reaction (A).

A possible alternative could be the introduction of water in liquid form into the reactor (6), in order to limit the transported gas volumes.

The effect of the condensation may be sufficient for bringing the gases to the condenser (8). However, a boost pump (7) may be required.

In the condenser (8), an oxygen stream which is the only gas emitted at this stage on the one hand and a liquid stream consisting of a mixture of composition $(2+\epsilon)$ HCl+x $H_2O$ which is sent into the reactor (1) on the other hand, are produced.

An exchanger placed inside the condenser (8) allows transfer of the calories from the achieved cooling towards the reactor (1) and the evaporator (4).

The oxygen stream (½ $O_2$) recovered in the condenser (8) is sent into a storage tank (9).

The other portion of the water from the evaporator (4) forms a gas stream of composition $4H_2O$ which is conveyed under pressure (a pressure above 1 bar) to a reactor (10) in which reaction (C) is conducted.

The reactor (10) also receives a liquid stream consisting of an acid $CeCl_3$ solution which contains fluoride ions in the form of the fluorinated compound being used as a catalyst, such as $CaF_2$. This liquid stream of composition $2CeCl_3+yH_2O+aHCl+\epsilon$ $CaF_2$, stems from the reactor (1) and is conveyed in liquid form towards the reactor (10) by means of a pump (12).

More specifically, the pressurized water stream is sent into a nebulizer (11) placed at the base of the reactor (10), said nebulizer also being fed with the $CeCl_3$ solution.

The liquid-vapor coupling within the nebulizer (11) allows very fine dispersion of the solution into the reactor (10) which is generally heated to a temperature from 600 to 1,000° C., for example from 700° C. to 750° C.

The gases emitted from the reactor (10) form a stream of composition $yH_2O+(6+a)HCl+H_2$ which is sent into a condenser (13) where it is separated into a hydrogen gas stream on the one hand and into a liquid stream of composition $(6+a)HCl+yH_2O$ on the other hand.

The hydrogen gas stream ($H_2$) recovered in the condenser (13) is sent into a storage tank (14).

The condenser (13) is equipped with an exchanger allowing transfer of calories towards the reactors (1) and (4).

The liquid stream from the condenser (13) is sent back towards the reactor (1) via a pump (15).

The reaction (C) conducted in the reactor (10) also produces solids, i.e. solid $CeO_2$ and solid $CaF_2$ ($2 CeO_2+\epsilon$ $CaF_2$) which have to be generally separated from the gases. The gas-solid separation at the outlet of the reactor (10) may be conducted for example with an apparatus of the cyclone type.

This gas-solid separation may be optional, since at this stage, the whole of the solids and gases produced in the reactor (10) is sent back to the reactor (1) except for hydrogen.

It is therefore possible to simply condense the hydrogen from the gas-solid mixture stemming from the reactor (10) without proceeding with a solid-liquid separation at the outlet of the latter.

As a conclusion, the reactor (1) which forms the core of the installation for applying the method according to the invention is therefore fed with a liquid stream of composition $(8+a+\epsilon)$ HCl+$(x+y)$ $H_2O$, a solid stream of composition 2 $CeO_2+c$ $CaF_2$; while a gas stream of composition $Cl_2+(4+x)$ $H_2O+\epsilon HCl$ and a liquid stream or acidic aqueous solution of composition $2CeCl_3+yH_2O+aHCl+\epsilon$ $CaF_2$ flow out of the reactor (1), or more specifically from the distillation column (2) located at the top of said reactor as regards the gas stream.

The requirement of using solutions containing as little hydrochloric acid as possible in the reactor (10) may be met by operating several reactors (1) in parallel, for example 2 to n reactors depending on the hydrogen flow rate to be produced.

In FIG. 1, the heat recovered in the condensers (8) (13) is used for supplying heat to the reactor (1) in order to achieve distillation of the water, to the evaporator (4) and optionally to a turbine (16).

Figure 3:
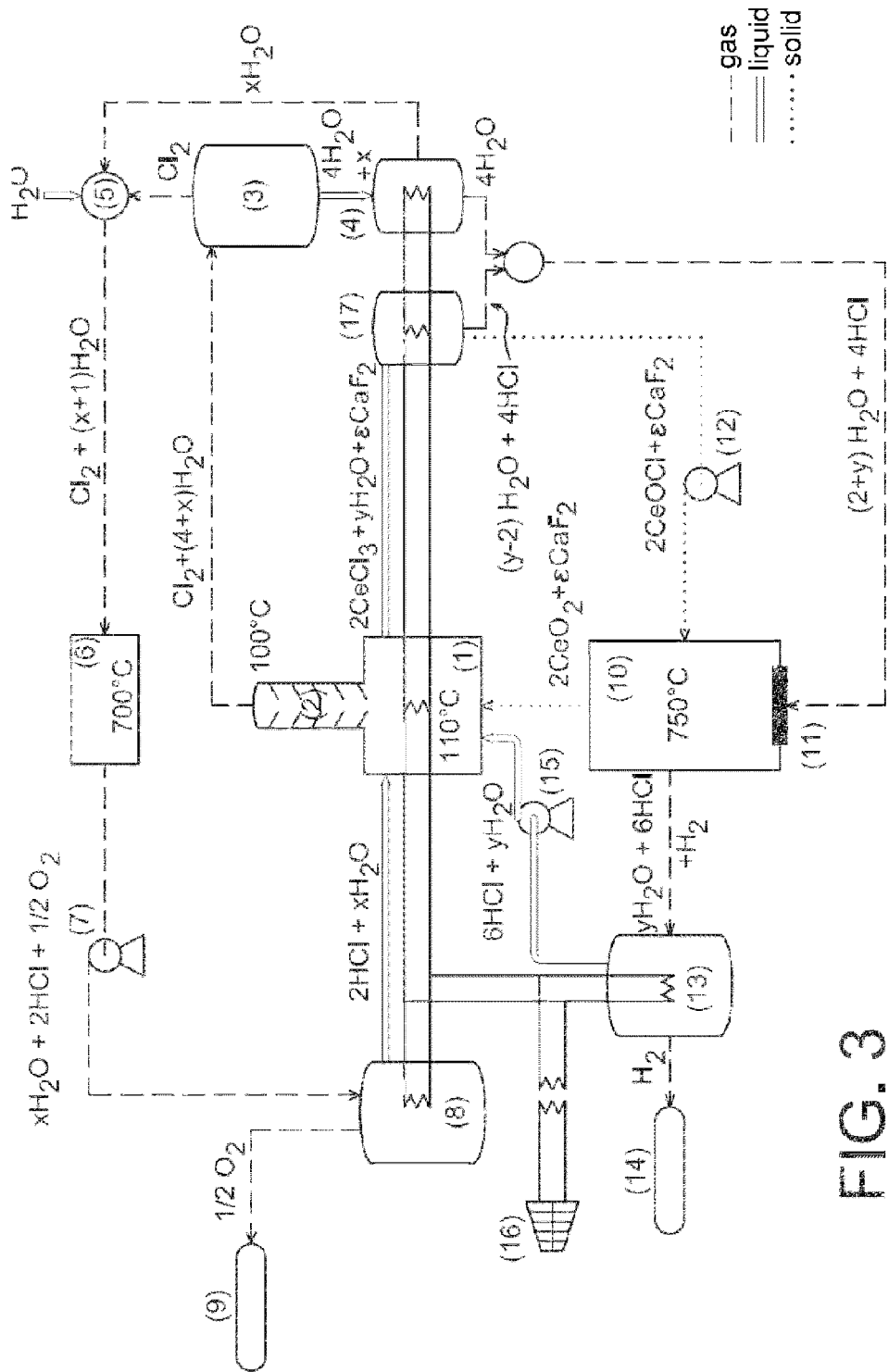
FIG. 3 is a diagram of the method according to the invention applying the second reaction scheme.

In FIG. 3, the diagram of the method according to the invention is illustrated, applying a cycle corresponding to the second reaction scheme mentioned above.

It has many similarities with the diagram of the method applying a cycle corresponding to the first reaction scheme as described in FIG. 1.

The reaction (B) conducted in the reactor (1) is identical with the one described in the case of the diagram of FIG. 1 with the only difference that one operates with amounts of material close to stoichiometry which produces a much less acidic solution of $CeCl_3$ than the one produced in the case of the first reaction scheme of FIG. 1.

This solution forms a liquid stream of composition $2CeCl_3+yH_2O+\epsilon$ $CaF_2$ which flows out of the reactor (1) in order to be sent into an evaporator (17) at the outlet of which a solid stream of composition $2CeOC_1+\epsilon$ $CaF_2$ is collected on the one hand and a possibly vaporized liquid stream, consisting of an acidic aqueous solution of composition $(y-2)H_2O+4HCl$ is collected on the other hand.

The solid stream of composition $2CeOC_1+\epsilon$ $CaF_2$ collected at the outlet of the evaporator (17) is transferred to the reactor (10) via the pump (12). In the reactor (10), it is treated with the combined vapor stream of composition $(2+y)H_2O+4HCl$ stemming from the combination of the current of composition $(y-2)H_2O+4HCl$ from the evaporator (17) and of the stream of composition $4H_2O$ from the evaporator (4). The solids (a stream of composition $2CeO_2+\epsilon$ $CaF_2$) optionally separated from the gas stream follow the same path as in FIG. 1 and are sent into the reactor (1).

Said stream of composition $(2+y) H_2O+4HCl$ is introduced into the reactor (10) by means of a diffuser (11).

At the top of the distillation column (2), a gas stream is produced of composition $Cl_2+(4+x) H_2O$ (and no longer $Cl_2+(4+x) H_2O+\epsilon HCl$ as in FIG. 1) which is conveyed towards the condenser (3) in order to separate $Cl_2$ (gas).

Because no over-stoichiometry of HCl is used for conducting reaction (B) in the reactor (1), the compositions of the streams have to be corrected accordingly, with respect to those given in connection with FIG. 1. Thus, the gas stream from the evaporator (4) to the pressure reducing valve (5) has a composition $xH_2O$, the gas stream from the pressure reducing valve (5) to the reactor (6) has a composition $Cl_2+(x+1) H_2O$, the gas stream from the reactor (6) to the condenser (8), via the pump (7), has a composition $xH_2O+2HCl+½ O_2$, the gas stream from the reactor (10) to the condenser (13) has a composition $yH_2O+6HCl+H_2$ f the liquid stream from the condenser (13) to the reactor (1) has a composition $6HCl+yH_2O$, and the liquid stream from the condenser (8) to the reactor (1) has a composition $2HCl+xH_2O$.

A turbine (16) provides a function identical with the one described in FIG. 1.

The preceding description in connection with the appended figures, demonstrates all the advantages of the method according to the invention already listed above.

Other advantages of the method according to the invention already demonstrated in document [4] are further:

- limitation of the volume of transported materials by means of the condensation steps (indeed there exists a ratio of 1,000 between the gas and liquid volumes);
- limitation of the amount of transported solids;
- separation of the gases formed by condensation, avoiding or thereby limiting the use of membranes;
- the use of azeotropic solutions with excess water which makes the control of the method more flexible at the distillation (2) and the hydrolysis (C) (C') carried out in the hydrolysis reactor (10);
- the system for recovering amounts of heat at the condensers, which is sufficient for supplying heat to the reactor (1) and to the evaporators. The remaining calories may allow supply of heat to a turbine (16) associated with the cycle.

The method according to the invention may be easily applied industrially and allows production of hydrogen at a large scale. The temperature levels provided in the method may allow heat to be supplied to an installation applying this method by various hot sources.

These sources may for example be nuclear sources by providing direct coupling of the installation applying the method of the invention with a nuclear reactor, for example of the HTR or VHTR type, in order to use a portion of the 70% heat energy lost during conversion into electricity.

These sources may also be solar sources in order to produce the heating-up of a heat transfer fluid capable of feeding the two reactions at high temperature (A and C).

The invention will now be described with reference to the following examples, given as an illustration and not as a limitation.

In the following examples, tests were conducted relating to reaction (B) with fluoride ions (Example 1 according to the invention) and the associated distillation (Example 2), the reaction (B') (Example 3), and the reaction (C) (Example 4).

EXAMPLES

Example 1

In this example, tests were conducted for applying reaction (B) in accordance with the method according to the invention with addition of fluoride ions as a catalyst.

These tests consisted of putting into presence in a three-necked flask heated to 110° C. surmounted by a reflux column, 47 milliliters of azeotropic HCl solution with 7.5 grams of $CeO_2$ which corresponds to 1.5 time the stoichiometry required for total chlorination of the cerium, and of adding a different amount of catalyst $CaF_2$ for each test.

The $CaF_2$ used for these tests has a grain size distribution centered on 5 μm.

Figure 4:
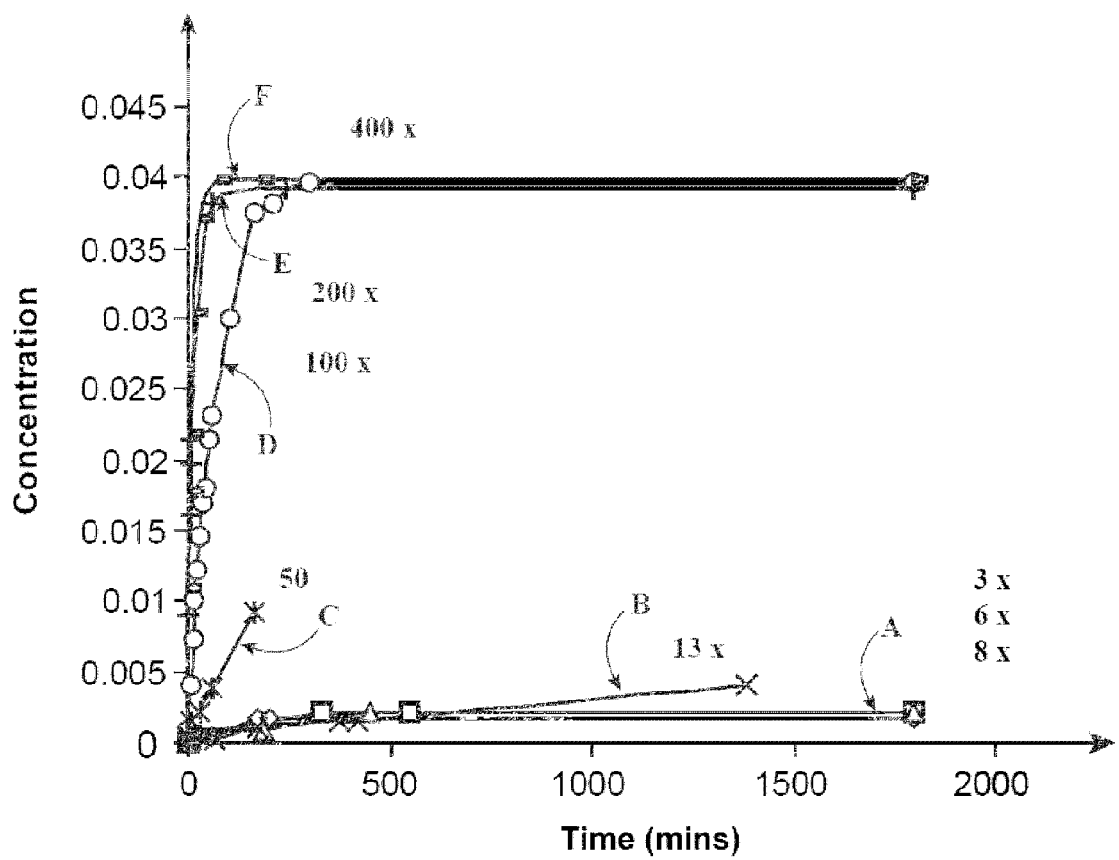
FIG. 4 is a graph which shows the results of the tests conducted in Example 2 and which illustrates the influence of the amount of $CaF_2$ on the $CeO_2$ hydrochlorination kinetics according to reaction B of the reaction schemes.

Tests were conducted with amounts of $CaF_2$ corresponding to a base amount of 0.25 mg of $CaF_2$ (the base amount corresponds to the introduced amount of $CaF_2$ for the amount of $CeO_2$ used in the test, i.e. 7.5 mg) multiplied each time by a different multiplier factor, i.e. 3, 6, 8, 13, 50, 100, 200 (50 mg of $CaF_2$), and 400 (100 mg of $CaF_2$). The results of the tests are plotted on FIG. 4 which shows the effects of adding the catalyst $CaF_2$ on the reaction applying 7.5 g of $CeO_2$. These results show that for an amount of 50 mg of $CaF_2$ for 7.5 mg of $CeO_2$, i.e. 6.6 mg/g of $CeO_2$, the reaction kinetics are optimum.

The tests shown here are conducted with a batch of $CeO_2$ without any fluorine and show the necessity of using fluoride ions as catalysts. They are important in order to determine the threshold amount of catalyst to be used.

Example 2

In this example, tests for applying the distillation associated with reaction B are conducted.

These tests consisted of putting into presence in a three-necked flask heated to 110° C., surmounted by a Vigreux column, 31 milliliters of an azeotropic solution of HCl with 8 milligrams of $CeO_2$ which corresponds to a stoichiometric mixture so that the totality of the $CeO_2$ reacts with the chloride ions.

From this test, the possibility of recovering 95% of the water formed during chlorination of cerium oxide was demonstrated.

The pH of the recovered water was then 2, demonstrating a very small amount of HCl in the solution ($10^{-2}$ mol·$L^{-1}$ versus 6.6 mol·$L^{-1}$ inside the reactor, i.e. a ratio of 660), which should only slightly disturb the reaction (A).

Example 3

In this example, tests for applying the reaction (B') were conducted.

These tests consisted of dissolving in a flask heated to 150° C. about 4 g of $CeCl_3$ in 40 milliliters of water and bringing the mixture to boiling until total evaporation.

The insoluble recovered residues correspond to cerium oxychloride CeOCl.

This total reaction has kinetics limited by the evaporation time.

Example 4

In this example, tests for applying reaction (C) were conducted.

These tests consisted of nebulizing in a tubular reactor heated to 700° C., a 0.2M solution of $CeCl_3$.

Nebulization is accomplished by means of a steam jet under a pressure of about 2 bars.

After having demonstrated the possibility of nebulizing the solution, the measurements downstream from the oven gave the possibility of observing very rapid production of hydrogen.

The product of the reaction was identified as being pure cerium oxide obtained with rapid kinetics.

What is claimed is:

1. A method for producing hydrogen via a thermochemical route from water, based on the cerium-chlorine cycle, wherein, according to a first reaction scheme, conducting the following reactions:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 4H_2O = 2CeO_2 + 6HCl + H_2; \quad (C)$$

or wherein, according to a second reaction scheme, conducting the following reactions:

$$H_2O + Cl_2 = 2HCl + \tfrac{1}{2}O_2; \quad (A)$$

$$8HCl + 2CeO_2 = 2CeCl_3 + Cl_2 + 4H_2O; \quad (B)$$

$$2CeCl_3 + 2H_2O = 2CeOCl + 4HCl; \quad (B')$$

$$2CeOCl + 2H_2O = 2CeO_2 + 2HCl + H_2; \quad (C')$$

wherein the reaction (B) for hydrochlorination of cerium oxide is conducted in a liquid phase, the cerium chloride passing into solution; and wherein the reaction (B) is catalyzed by fluoride ions.

2. The method according to claim 1, wherein the fluoride ions appear in the form of at least one fluoride selected from metal fluorides and earth alkaline metal fluorides.

3. The method according to claim 1, wherein the amount of fluoride ions is at least 1.5 mg per gram of $CeO_2$.

4. The method according to claim 1, wherein the reaction (A) for reducing chlorine is conducted with excess water relatively to the stoichiometry of the reaction.

5. The method according to claim 1, wherein the reaction (A) is conducted in a gas phase at a temperature from 500 to 1,000° C.

6. The method according to claim 1, wherein the reaction (A) is assisted by UV irradiation.

7. The method according to claim 1, wherein, in the first reaction scheme, the reaction (B) is conducted with excess HCl.

8. The method according to claim 7, wherein, in the first reaction scheme, the reaction (B) is conducted with an excess of hydrochloric acid by a factor from 1 to 4 based on the stoichiometry described in the corresponding chemical equation.

9. The method according to claim 1, wherein the reaction (B) is conducted in an aqueous solution of hydrochloric acid brought to a temperature from 30 to 110° C.

10. The method according to claim 1, wherein the reaction (B) produces an acidic aqueous solution of cerium chloride which, in the first reaction scheme, is atomized in the reaction (C) or nebulized by pressurized steam, whereby the cerium chloride is hydrolyzed into solid $CeO_2$.

11. The method according to claim 10, wherein the reaction (C) is conducted at a temperature from 600 to 1,000° C.

12. The method according to claim 1, wherein the reaction (B) produces an acidic aqueous solution of cerium chloride which, in the second reaction scheme, is vaporized in the reaction (B') in order to give solid cerium oxychloride CeOCl.

13. The method according to claim 12 wherein the reaction (B') is conducted at a temperature from 100 to 300° C.

14. The method according to claim 12 wherein the reaction (C') for hydrolysis of cerium oxychloride is conducted by means of steam, optionally pressurized steam, whereby cerium oxychloride is hydrolyzed into solid $CeO_2$.

15. The method according to claim 1, wherein the reaction (C) of the first reaction scheme or the reaction (C') of the second reaction scheme produces a mixture of gas and of solid $CeO_2$ from which hydrogen is separated by condensation, optionally after separation of solid $CeO_2$ from the gases.

16. The method according to claim 15, wherein the gases are condensed to give an hydrochloric acid solution sent to reaction (B), as well as solid $CeO_2$.

17. The method according to claim 1, wherein the reactions (C) and (C') are conducted with excess water relatively to stoichiometry.

18. The method according to claim 1, wherein the reaction (A) produces an HCl and oxygen gas mixture from which oxygen is separated by condensation.

19. The method according to claim 1, wherein the water formed during reaction (B) is separated by distillation.

20. The method according to claim 19, wherein the water separated by distillation is conveyed with the formed chlorine gas, and optionally the excess hydrochloric acid, to a condensation step at the end of which chlorine on the one hand, and water and optionally excess hydrochloric acid on the other hand are recovered.

21. The method according to claim 20, wherein the recovered water is sent into the reaction (C), or the reaction (C'), and the chlorine and optionally the excess hydrochloric acid are sent into reaction (A).

22. The method according to claim 15, wherein energy recovered during the condensation is used for ensuring vaporizations and distillation and optionally for powering a turbine.

23. The method according to claim 18, wherein energy recovered during the condensation is used for ensuring vaporizations and distillation and optionally for powering a turbine.

24. The method according to claim 20, wherein energy recovered during the condensations is used for ensuring vaporizations and distillation and optionally for powering a turbine.

* * * * *